United States Patent
Okazaki et al.

(10) Patent No.: US 7,084,186 B2
(45) Date of Patent: Aug. 1, 2006

(54) CROSSLINKABLE RESIN COMPOSITIONS

(75) Inventors: Eiichi Okazaki, Aichi (JP); Hideo Matsuzaki, Aichi (JP); Keiji Maeda, Aichi (JP); Kuniniko Mizotani, Aichi (JP)

(73) Assignee: Toagosei Co., Ltd., Tokyo (JP)

( * ) Notice: Subject to any disclaimer, the term of this patent is extended or adjusted under 35 U.S.C. 154(b) by 448 days.

(21) Appl. No.: 09/883,406

(22) Filed: Jun. 19, 2001

(65) Prior Publication Data

US 2002/0028302 A1 Mar. 7, 2002

(30) Foreign Application Priority Data

Jun. 19, 2000 (JP) .......................... 2000-183432
Jul. 4, 2000 (JP) .......................... 2000-202897

(51) Int. Cl.
*C08F 2/46* (2006.01)

(52) U.S. Cl. .............. 522/152; 522/90; 522/96; 522/150; 522/151; 522/164; 522/173; 522/176; 522/166; 522/167; 522/142; 522/182; 522/134; 522/135; 522/16; 522/84; 427/508; 427/487; 427/520; 427/496; 528/392; 528/310; 528/322; 528/342

(58) Field of Classification Search .............. 528/392, 528/310, 322, 342; 522/176, 173, 166, 164, 522/150, 151, 152, 167, 90, 96, 97, 104, 522/182, 134, 142, 145, 84, 86; 427/508, 427/520, 487, 496

See application file for complete search history.

(56) References Cited

U.S. PATENT DOCUMENTS 4,033,920 A 7/1977 Isozaki et al.
4,416,975 A * 11/1983 Green et al. ............. 430/270.1
5,306,744 A 4/1994 Wolfersberger et al.
5,409,971 A 4/1995 Wolfersverger et al.
6,329,443 B1 * 12/2001 Okazaki et al. ............. 522/134

FOREIGN PATENT DOCUMENTS

| JP | 51017922 | | 2/1976 |
| JP | 51023531 | | 2/1976 |
| JP | 5009247 | | 1/1993 |
| JP | 6211950 | | 8/1994 |
| JP | 07-102027 A | | 4/1995 |
| JP | 2000/234044 | | 8/2000 |
| JP | 2000/234045 | | 8/2000 |
| JP | 2001-172336 | * | 6/2001 |
| WO | WO 98/11152 | * | 3/1998 |
| WO | 98/58912 | * | 12/1998 |

OTHER PUBLICATIONS

128:24560 abstract for 98/11152 from STN database.*
RadTech Europe 95, Exhibit & Conference for Radiation Curing, Sep. 24–27, 1995, in Maastricht/NL.
H. Anderson & A. Hult, Initiator–Free Photopolymerization of an Aliphatic Vinyl Ether–Maleimide Monomer, Dept. of Polymer Technology, vol. 69, No. 865, Feb. 1997.

* cited by examiner

*Primary Examiner*—James J. Seidleck
*Assistant Examiner*—Sanza L. McClendon
(74) *Attorney, Agent, or Firm*—Kendrew H. Colton; Fitch Even Tabin & Flannery

(57) ABSTRACT

Crosslinkable resin compositions that are cured easily by irradiation with active energy beams and particularly cured quickly with ultraviolet ray are provided, which comprises a polymer containing a maleimido group and an ethylenically unsaturated group. The composition may be an aqueous composition. They provide cured films which are excellent in durability, free from coloring and odors, and also excellent in abrasion resistance, adhesion to substrates, surface smoothness, and chemical resistance.

24 Claims, No Drawings

CROSSLINKABLE RESIN COMPOSITIONS

The present invention relates to crosslinkable resin compositions comprising a polymer that contains a maleimido group and an ethylenically unsaturated group. These compositions provide coating films and molded articles high in durability and abrasion resistance, and therefore can be used as coating agents, adhesives, binders, molding materials and the like, and can serve effectively in these technical fields. Furthermore, the compositions include aqueous or water-based crosslinkable resin compositions that can be crosslinked by irradiation with active energy beams such as ultraviolet rays. The aqueous or water-based compounds are useful as coating materials including paints, coatings and printing inks as well as bonding agents for non-woven fabrics or the like, adhesives, fillers and resists, and among them, are useful as the coating materials, particularly paints for wood.

Because of their fast curability, active energy beam-curable compositions not only greatly decrease the energy and time required for drying, but also eliminate the space required for installation of dryers and other related apparatus, as compared to conventional solvent-based resin compositions. Furthermore, the active energy beam-curable compositions require only a small amount of solvents, or require no solvents. Thus, they are considered to be a material friendly to global environment, and their consumption is increasing year by year.

In recent years, active energy beam-curable compositions have been in wider use in various fields. However, performance required in some fields is difficult to achieve with a conventional combination of ingredients, namely, oligomers and monomers.

In the meantime, plastic moldings produced from polymethyl methacrylate resin, polycarbonate resin and the like, are used in different field since they have many advantages that they are light in weight, high in impact resistance and easy to shape. Because of low surface abrasion resistance, however, these plastic moldings are liable to be damaged on their surface, and their improvement in abrasion resistance is demanded. Their increase in durability has also been strongly demanded as they are often used outdoors as parts of automobiles.

Some studies have been carried out in an effort to improve their abrasion resistance by coating the surface of the plastic moldings with an ultraviolet ray-curable composition. However, it is sometimes difficult to obtain sufficient abrasion resistance and adhesion to plastic materials, and even if these properties can be improved to a satisfactory level, the problem on durability often remains unsolved.

The ultraviolet ray-curable composition is composed mainly of (meth)acrylates, and is a typical active energy beam-curable composition. In order to cure this composition with an ultraviolet ray, a photopolymerization initiator that generates active radicals upon exposure to the ultraviolet ray has to be added thereto. However, such a photopolymerization initiator tends to remain in cured products of the composition, deteriorating durability of the cured products and causing coloring, fading, peeling of coated films, cracking, etc. Thus, most ultraviolet ray-curable compositions cannot serve sufficiently for the purposes that require durability. Furthermore, decomposition products of photopolymerization initiators also remain in cured products and often cause an offensive odor.

Attempts to improve the durability have been made by using durability improvers such as ultraviolet ray absorbers, light stabilizers and antioxidants. However, they tend to fail to work effectively, and cause a problem that durability improvers suppress curing reaction and reduce ultraviolet ray curability of the composition, leading to deterioration of productivity.

Recently, it has been revealed that N-substituted maleimide compounds serve as a photopolymerization initiators, and it has been reported that vinyl ethers or acrylates can be polymerized by ultraviolet rays without using photopolymerization initiators (Sonny Jonsson et al., Proceeding of Radtech '95 Europe (Academic Day) p.34).

Compared to conventional photopolymerization initiators, N-substituted maleimide compounds as photopolymerization initiators are superior in that they are excellent in thin film curability and are free from polymerization inhibition that may be caused by oxygen contained in air. However, the maleimide compounds are difficult to handle because they are solid and have high melting points. To use them in a liquid state, they have to be dissolved in such solvents as (meth)acrylates, but some maleimide compounds are low in solubility in (meth)acrylates, and they are likely to precipitate as their content is increased in a composition. Thus, they are used in limited formulations, and often cannot attain desired purposes if formulations are changed according to required properties for different objectives.

Furthermore, these maleimide compounds are low molecular weight substances. Thus, when a maleimide compound is added to a curing composition as a photopolymerization initiator, it degrades properties of the cured product if it remains unreacted in the product.

The present inventors have revealed that some compositions comprising polymers that contain maleimide group-bearing (meth)acrylates as constitutional monomeric units can solve the above problem (International Patent Publication WO98/58912). These compositions, however, are not effective enough in some cases where a high curing rate is required or where excellent durability or chemical resistance is needed.

It is also known that some low molecular weight compounds having a maleimide group and a vinyl ether group as an ethylenic unsaturation are high in curability (Henrik Andersson et al., Journal of Coating Technology, vol.69, No.865, p.91, 1997). Cured films of the compounds are, however, poor in hardness, adhesion to substrates, water resistance and chemical resistance.

It has been feared in recent years that organic substances, including solvents and detergents, used in different industrial fields are released in the atmosphere to promote global-scale air pollution, and may affect living bodies. To avoid this, some efforts have been made to develop aqueous or water-based compositions for coatings, inks and adhesives in place of conventionally used solvent-based ones.

Studies are also carried out to process an active energy beam-curable polymer containing an unsaturated group into a water-based one that may be used as a major component for the above-mentioned uses. For example, a method in which a carboxyl-containing polymer is produced in water in the presence of an emulsifier, followed by addition reaction of the resulting polymer with a compound that contains an epoxy group and an unsaturated group (JP-A-06-211950).

As a method for eliminating solvents from paints, use of an ultraviolet ray-curable composition free from organic solvents is also studied. Known ultraviolet ray-curable paint compositions include those consisting of a reactive diluent and an oligoester (meth)acrylate such as polyester acrylate, epoxy acrylate, or urethane acrylate. For example, JP-A-05-9247 discloses ultraviolet ray-curable compositions that contain an urethane acrylate of a specific structure and an unsaturated polyester.

There are some other proposals in which aqueous compositions that contain polymer emulsions are used like those described above (JP-A-51-17922, JP-A-51-23531, and JP-A-06-211950). When such polymer emulsions containing unsaturated groups as stated above are used for various uses, photopolymerization initiators have to be added thereto as a radical source so as to allow the polymer to cure by irradiation with ultraviolet ray. If the aqueous emulsion containing such an unsaturated group-containing polymer together with a photopolymerization initiator is used, however, degradation products of the photopolymerization initiator tend to remain in the cured film and cause some problems including offensive odors and coloring of the cured film. Furthermore, such emulsions often fail to provide the cured film with sufficient hardness.

Conventional solventless ultraviolet ray-curable paint compositions have a problem of failing to give sufficient adhesion between cured films and substrates. Such poor adhesion is attributed to the fact that ultraviolet ray-curable compositions cure in a short time to form films and are likely to accumulate much strain caused by volumetric shrinkage upon curing, compared to other compositions containing solvent-evaporation type polymers and those containing thermosetting polymers that cure gradually as the strain is relaxed in the course of heat drying or heat curing. Such solventless compositions are generally high in viscosity, and thus poor in workability upon production and coating.

Conventional aqueous paint compositions tend to fail to provide dry films with sufficient hardness, solvent resistance, and water resistance. It also tends to be inferior in surface luster and adhesion to substrates, and particularly poor in water resistance.

The present inventors revealed that an emulsion comprising a maleimido group-containing polymer and a multifunctional (meth)acrylate (Japanese Patent Application No. H11-355157) and a composition produced by dispersing or dissolving a polymer that contains a maleimido group and an acidic group or a salt thereof, in an aqueous medium (Japanese Patent Application No. H11-361876) serve as aqueous crosslinkable polymer compositions which solve the above problem, and which are excellent in curability by active energy beams, particularly by ultraviolet ray, and form coloring- and odor-free cured films high in hardness, solvent resistance and water resistance.

However, even the above compositions would be insufficient in performance when a still higher curing rate is required or when resulting cured films are required to have still better chemical resistant properties such as resistance to alkali and solvent.

An object of the present invention is to provide compositions that can be cured easily by irradiation with active energy beams and in particular, can be cured quickly by irradiation with ultraviolet ray, to provide cured products high in durability, free from offensive odors, and also good in abrasion resistance and adhesion to substrates.

Another object of the present invention is to provide aqueous or water-based compositions that can be cured easily by irradiation with active energy beams and in particular, can be cured quickly by irradiation with ultraviolet ray, to provide cured products free from coloring or offensive odors and good in smoothness and adhesion, and provide cured films still higher in chemical resistance.

The present inventors have carried out a variety of studies and achieved the invention after revealing that the above problems can be solved by means of compositions that comprise a polymer having a maleimido group and an ethylenically unsaturated group.

Also, the present inventors have found that the above problems can be solved by means of aqueous or water-based compositions that comprise a polymer having a maleimido group and an ethylenically unsaturated group, preferably aqueous or water-based compositions that comprise a polymer having a maleimido group, an ethylenically unsaturated group and an acidic group.

The invention is described in detail below.

In the present specification, "acrylate and/or methacrylate", "acrylic acid and/or methacrylic acid" and "acryloyl group and/or methacryloyl group" are referred to as "(meth)acrylate", "(meth)acrylic acid" and "(meth) acryloyl group", respectively, and the unit of acid value, which is mgKOH/g, is omitted.

1. Component (A)

The compositions of the present invention contain, as an essential component, (A) a polymer that contains a maleimido group and an ethylenically unsaturated group. This polymer is hereinafter referred to as component (A). If a particular composition of the invention is an aqueous crosslinkable resin composition, the component (A) may be dissolved or dispersed in an aqueous medium.

There are many maleimido groups that can be contained in the component (A), but those represented by the following formula (1) are preferred.

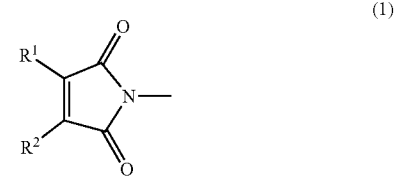

(1)

where $R^1$ and $R^2$ independently denote a hydrogen atom, halogen atom, alkyl group, alkenyl group, or aryl group, or both denote a saturated or unsaturated hydrocarbon group of a 5- or 6-membered ring formed by linkage with each other.

The aryl group includes phenyl groups. The saturated or unsaturated hydrocarbon group of a 5- or 6-membered ring formed by linkage with each other includes a group represented by —$CH_2CH_2CH_2$—, a group represented by —$CH=CHCH_2$—, a group represented by —$CH_2CH_2CH_2CH_2$—, a group represented by —$CH_2CH=CHCH_2$—, and a group represented by —$CH=CHCH=CH$—.

It is preferred that either $R^1$ or $R^2$ is a hydrogen atom while the other is an alkyl group with 4 or less carbon atoms, or that both $R^1$ and $R^2$ are an alkyl group with 4 or less carbon atoms, or that $R^1$ and $R^2$ are a saturated hydrocarbon group that are combined to form a carbocyclic structure, because these compounds can easily form polymers, can be high in solubility and storage stability, and can provide compositions that are cured into crosslinked films excellent in water-resistance. Among others, they are preferably saturated hydrocarbon groups that are combined to form a carbocyclic structure, particularly a group represented by —$CH_2CH_2CH_2CH_2$— being preferred.

Typical maleimido groups are as shown by the formulas (2) to (7), of which those expressed by the formula (2) or (3) are preferred in terms of solubility and storage stability.

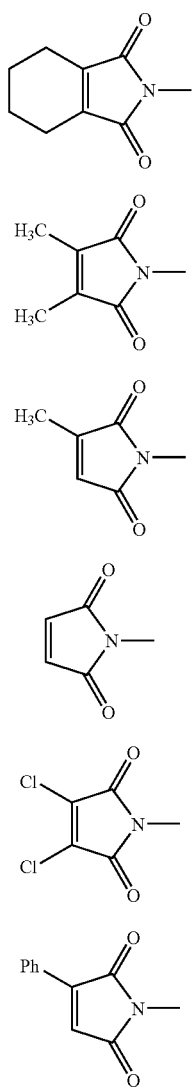

There are many ethylenically unsaturated groups that can be contained in the component (A), such as vinyl groups, allyl groups and (meth)acryloyl groups. Among them, (meth)acryloyl groups are preferred because they are excellent in curability.

1-1. Polymer

In the component (A) of the present invention, the maleimido group may, for example, be bonded via an ester or urethane linkage to an ethylenically unsaturated group-containing polymer, or the ethylenically unsaturated group may, for example, be bonded via an ester or urethane linkage to a maleimido group-containing polymer. The component (A) can be polymers produced by different methods, preferably by the methods (1) to (7) shown below. These methods are classified into methods in which a prepolymer containing a functional group and a maleimido group is first produced and subsequently reacted with a compound containing a functional group that reacts with the former functional group (methods (1)–(5) described below), and methods in which a prepolymer containing a functional group is first produced and subsequently reacted with a compound containing a maleimido group and a functional group that react with the former functional group (methods (6) and (7) described below).

(1) Method in which a compound containing an ethylenically unsaturated group and an isocyanate group (hereinafter referred to as isocyanate-containing unsaturated compound) is added to a prepolymer containing a maleimido group and a hydroxyl group.

(2) Method in which a compound containing an ethylenically unsaturated group and an epoxy group (hereinafter referred to as epoxy-containing unsaturated compound) is added to a prepolymer containing a maleimido group and an acidic group.

(3) Method in which a compound containing an ethylenically unsaturated group and an acidic group (hereinafter referred to as acidic group-containing unsaturated compound) is added to a prepolymer containing a maleimido group and an epoxy group.

(4) Method in which a compound containing an ethylenically unsaturated group and a hydroxyl group (hereinafter referred to as hydroxyl-containing unsaturated compound) is added to a prepolymer containing a maleimido group and an isocyanate group.

(5) Method in which a hydroxyl-containing unsaturated compound is added to a prepolymer containing a maleimido group and an acid anhydride group.

(6) Method in which a compound containing a maleimido group and a hydroxyl group is added together with and a hydroxyl-containing unsaturated compound to a prepolymer containing an acid anhydride group.

(7) Method in which a compound containing a maleimido group and an acidic group is added together with an acidic group-containing unsaturated compound to a prepolymer containing an epoxy group.

1-1-1. Prepolymer Production Method

To produce the maleimido group-containing prepolymer used in methods (1)–(5) as above, a compound containing an ethylenically unsaturated group and a maleimido group (hereinafter referred to as maleimido-containing unsaturated compound) can be copolymerized with a hydroxyl-containing unsaturated compound (as in method (1) described above), an acidic group-containing unsaturated compound (as in method (2) described above), an epoxy-containing unsaturated compound (as in method (3) described above), an isocyanate-containing unsaturated compound (as in method (4) described above), or a compound containing an ethylenically unsaturated group and an acid anhydride group (hereinafter referred to as acid-anhydride-containing unsaturated compound) (as in method (5) described above).

Preferred maleimido-containing unsaturated compounds are (meth) acrylates containing a maleimido group, which can be produced by the methods described in the following literatures or patents:

Kiyoshi Kato et al, "Journal of Synthetic Organic Chemistry Association", 30 (10), 897, (1972).

Javier de Abajo et al, "Polymer", vol.33 (5), (1992).

JP-A-56-53119

JP-A-01-242569

Preferable examples of the (meth)acrylates containing a maleimido group are represented by the formula (8) shown below.

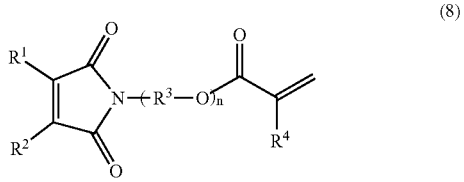

(8)

where $R^1$ and $R^2$ mean the same as above, $R^3$ denotes a linear or branched alkylene group with 1–6 carbon atoms, $R^4$ denotes a hydrogen atom or a methyl group, and n denotes an integer in the range of 1 to 6.

Preferred examples of hydroxyl-containing unsaturated compounds include hydroxyalkyl (meth)acrylates such as hydroxyethyl (meth)acrylates and hydroxypropyl (meth)acrylates, and hydroxyalkyl vinyl ethers such as hydroxybutyl vinyl ether.

Preferred examples of acidic group-containing unsaturated compounds include an unsaturated compound containing a carboxyl group, an unsaturated compound containing a sulfonic acid group, and an unsaturated compound containing a phosphoric acid group. Among them, the unsaturated compound containing a carboxyl group is particularly preferred.

Preferred examples of the unsaturated compound containing a carboxyl group include (meth)acrylic acid; crotonic acid; cinnamic acid; dimmers and larger oligomers produced by Michael addition reaction of unsaturated carboxylic acids such as (meth)acrylic acid; and carboxyl-containing (meth)acrylates such as ω-carboxypolycaprolactone mono(meth)acrylate, phthalic acid mono hydroxyethyl (meth)acrylate, and succinic acid mono hydroxyethyl (meth)acrylate. Preferred examples of the unsaturated compound containing a sulfone group include (meth)acrylamide dimethylpropanesulfonic acid and styrenesulfonic acid.

Preferred examples of epoxy-containing unsaturated compounds include epoxy group-containing (meth)acrylates such as glycidyl (meth)acrylates, and (meth)acrylates containing a cyclohexene oxide group as represented by the following formula (9).

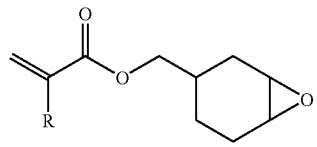

(9)

Preferred examples of isocyanate-containing unsaturated compounds include (meth)acryloyl oxyethyl isocyanates and dimethyl-m-isopropenylbenzyl isocyanates as represented by the following formula (10).

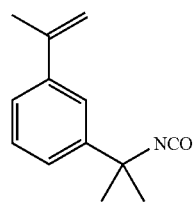

(10)

Preferred examples of acid-anhydride-containing unsaturated compounds include maleic anhydride and itaconic acid.

The prepolymer can also be produced by, in case of the method (6), polymerizing acid-anhydride-containing unsaturated compounds along with other monomers as required, and in case of the method (7), polymerizing epoxy-containing unsaturated compounds along with other monomers as required.

The prepolymer may be copolymerized with other monomers as required. Such other monomers include styrene, α-methylstyrene, (meth)acrylonitrile, vinyl acetate, and (meth)acrylate. Concrete examples of (meth)acrylates include alkyl (meth)acrylates such as methyl (meth)acrylate, ethyl (meth)acrylate, butyl (meth)acrylate, isobutyl (meth)acrylate, and 2-ethylhexyl (meth)acrylate; alicyclic alkyl (meth)acrylates such as cyclohexyl (meth)acrylate; substituted aryl (meth)acrylates such as benzyl (meth)acrylate; alkoxy (meth)acrylates such as 2-methoxyethyl (meth)acrylate, and 2-ethoxyethyl (meth)acrylate; isobornyl (meth)acrylate; and alkoxysilyl group-containing (meth)acrylates. Other useful monomers include macromonomers. When they are used, the component (A) is in the form of a graft copolymer or block copolymer. Examples of macromonomers include those containing polysiloxane, and those containing a fluorine polymer chain.

When a composition of the present invention is to be employed for use that require durability, aromatic monomers such as styrene and α-methylstyrene should not be used or should account for not more than 20 wt % of the total monomers.

When a composition of the present invention is intended for use that require chemical resistance, alicyclic alkyl (meth)acrylates as described above are used preferably. In this case, their copolymerization ratio is preferably 0 to 80 wt % of the total monomers.

The prepolymer can be produced by polymerizing these monomers by an ordinary method such as solution polymerization, emulsion polymerization, or high-temperature continuous polymerization. In the above methods (2), (3) and (7) in which none of isocyanate-containing unsaturated compounds and acid-anhydride-containing unsaturated compounds that are both decomposed by water is used, the prepolymer can be produced by any of the above processes, i.e. solution polymerization, emulsion polymerization and high-temperature continuous polymerization. However, in the above methods (1), (4), (5) and (6) in which an isocyanate-containing unsaturated compound or an acid-anhydride-containing unsaturated compound is used, it is preferable that the prepolymer is produced by either solution polymerization or high-temperature fast continuous polymerization.

When synthesis is performed by solution polymerization, the prepolymer can be obtained by dissolving monomers as raw materials in an organic solvent and adding thereto a thermal polymerization initiator, followed by heating and stirring.

When synthesis is performed by radical solution polymerization, the prepolymer can be obtained by dissolving monomers as raw materials in an organic solvent, and adding thereto a thermal radical polymerization initiator, followed by heating and stirring. A chain transfer agent may be used as required to adjust molecular weight of resulting polymers. Examples of useful thermal polymerization initiators include peroxides, azo compounds and redox initiators that generate radical species by heat.

Examples of peroxides include benzoyl peroxide, lauroyl peroxide, cumene hydroperoxide, t-butylhydroperoxide, and dicumylperoxide. Examples of azo compounds include azobisisobutyronitrile and azobis-2,4-dimethylvaleronitrile.

Examples of redox initiators include hydrogen peroxide-ferrous salt, peroxodisulfate-sodium hydrogen sulfite, and cumene hydroperoxide-ferrous salt. Useful organic solvents include benzene, toluene, ethyl acetate, methanol, dimethylformamide, and the like. Chain transfer agents include dodecylmercaptan, xanthic acid disulfide, diazothioether, 2-propanol, and the like.

The prepolymer can also be produced by high-temperature continuous polymerization as required. High-temperature continuous polymerization is preferred in that low-molecular-weight, low-viscosity prepolymers can be produced and also in that thermal polymerization initiators are not required at all or required only in a small amount to produce a desired prepolymer, thereby providing a copolymer that is free of impurities that would generate radical species when heated or irradiated with light, and thus is high in stability and purity.

High-temperature continuous polymerization may be performed according to known procedures as disclosed in JP-A-57-502171, JP-A-59-6207, and JP-A-60-215007. For instance, a pressure-type reactor filled with a solvent is heated under pressure up to a specified temperature, and subsequently monomers or a mixture of monomers with a polymerization solvent as required, are fed to the reactor at a constant feed rate, and the reaction liquid up to an amount that corresponds to the quantity of the supplied monomer mixture is extracted.

The monomer mixture may contain a thermal polymerization initiator as required. The reaction temperature is preferably in the range of 150° C. to 350° C. The pressure depends on the reaction temperature as well as the boiling points of the monomer mixture and the solvent, and has no significant effect on the reaction, but should be merely such that the above-mentioned reaction temperature can be maintained. The retention time of the monomer mixture is preferably 2–60 minutes.

Emulsion polymerization may be performed by an ordinary method. For instance, monomers are dispersed in an aqueous medium using an emulsifier, followed by heating and stirring in the presence of a polymerization initiator, or monomers are dispersed in an aqueous medium using an emulsifier to produce an aqueous emulsion, and the emulsion is then added to an aqueous medium while being heated and stirred in the presence of a polymerization initiator.

When a prepolymer is produced by emulsion polymerization, the amount of the polymerization initiator may be increased or a chain transfer agent may be added to provide a polymer with a desired molecular weight as described below. Examples of the polymerization initiator include those described below in relation to polymerization methods, while examples of the chain transfer agent include those mentioned above.

A variety of useful emulsifiers are available including anionic ones such as sodium dialkyl sulfosuccinate, sodium dodecylbenzenesulfonate, sodium lauryl sulfate, sodium polyoxyethylene alkylphenyl ether sulfate, and sodium alkyldiphenyl ether disulfonate; nonionic ones such as polyoxyethylene higher alcohol ether, and polyoxyethylene alkyl phenyl ether; anionic polymer emulsifiers such as those based on polycarboxylic acid or polysulfonic acid; nonionic polymer emulsifiers such as polyvinyl alcohol; and reactive emulsifiers containing a radical polymerization inducing group such as acryloyl, aryl and propenyl groups.

In cases where water resistance is required, deterioration in water resistance by the use of an emulsifier should be avoided by using a reactive emulsifier or by using an emulsifier-free polymerization method in which a section of a polymerization initiator, instead of emulsifier, works to cause emulsification of grains.

1-1-2. Polymer Production Method

When the above methods (1) to (5) are used, polymers can be produced by adding an isocyanate-containing unsaturated compound (as in method (1)), an epoxy-containing unsaturated compound (as in method (2)), an acidic group-containing unsaturated compound (as in method (3)), or a hydroxyl-containing unsaturated compound (in methods (4) and (5)) to prepolymers that contain a maleimido group together with an appropriate functional group.

When the above method (6) is used, polymers can be produced by adding not only a compound containing a maleimido group and a hydroxyl group but also a hydroxyl-containing unsaturated compound, to acid-anhydride-containing prepolymers. When the method (7) is used, polymers can be produced by adding not only a compound containing a maleimido group and an acidic group but also an acidic group-containing unsaturated compound, to epoxy-containing prepolymers.

Examples of isocyanate-containing unsaturated compounds, epoxy-containing unsaturated compounds, carboxyl-containing unsaturated compounds, and hydroxyl-containing unsaturated compounds are the same as described above.

Examples of compounds containing a maleimido group and a hydroxyl group for the method (6) include those represented by the following formula (11).

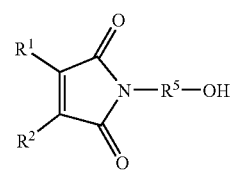

(11)

where $R^1$ and $R^2$ denote the same as above, and $R^5$ denotes a linear or branched alkylene group with 1 to 6 carbon atoms.

Examples of compounds containing a maleimido group and an acidic group for the method (7) include those represented by the following formula (12).

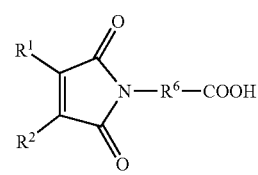

(12)

where $R^1$ and $R^2$ denote the same as above, and $R^5$ denotes a linear or branched alkylene group with 1 to 6 carbon atoms.

In every case, a desired polymer can be produced by adding an appropriate compound to a prepolymer in an organic solvent, an aqueous medium or a solvent-free system. Conditions required for each addition reaction can be met by selecting an appropriate reaction temperature, reaction time and catalyst.

Number average molecular weight of the component (A) is preferably 1,000 or more, more preferably in the range of 1,000 to 1,000,000, most preferably in the range of 10,000 to 500,000. If it is less than 1,000, the resulting product is often insufficient in durability or poor in adhesion. If the molecular weight is too high, for instance more than 1,000, 000, compositions become too high in viscosity, thereby deteriorating workability, reducing solution stability, or degrading properties of coating films.

For purposes of the present invention, the number average molecular weight is determined by gel permeation chromatography (GPC) using tetrahydrofuran as a solvent, followed by conversion on the basis of the molecular weight of polystyrene.

The compositions of the present invention require the component (A) as an essential component, which is used, for instance, in a form of a solution of the component (A) in an organic solvent, an aqueous dispersion of the component (A), or a composition of the component (A) and the below-described component (B).

When the present composition is in a form of an aqueous composition, it may be the reaction liquid per se resulting from the above-mentioned addition reaction as long as the liquid is an aqueous dispersion of the component (A). If the reaction liquid resulting from the addition reaction is in a form of a solution of the component (A) in an organic solvent, the organic solvent is removed by evaporation etc., and the component (A) obtained may be dispersed in an aqueous medium using an emulsifier. Preferred emulsifiers include the same as described above.

Content of the maleimido group in the component (A) is preferably 0.04 to 4 mmol/g, more preferably 0.2 to 3 mmol/g. A content of less than 0.04 mmol/g may cause poor chemical resistance and insufficient curing or crosslinking (hereinafter simply referred to as curing) which will result in insufficient hardness, while a content of more than 4 mmol/g may cause poor adhesion since curing may take place only on the surface of a thick coating film.

Content of the ethylenically unsaturated group in the component (A) is preferably in the range of 0.1 to 4 mmol/g. A content of less than 0.1 mmol/g may cause poor chemical resistance and insufficient curing which will result in insufficient hardness, while a content of more than 4 mmol/g may cause poor adhesion.

Content of the component (A) in the present composition is preferably 5 to 95 wt % when it is a solution in an organic solvent, while the content is preferably 10 to 70 wt %, more preferably 20 to 60 wt % when it is an aqueous dispersion. If this proportion is less than 5 wt % (in case of a solution in organic solvent) or 10 wt % (in case of an aqueous dispersion), drying process following coating on substrates may require large amounts of energy and time for the drying. If the content is more than 95 wt % (in case of a solution in organic solvent) or 70 wt % (in case of an aqueous dispersion), it may be difficult to produce compositions, or the resulting compositions may become too high in viscosity to apply. When the component (A) is combined with the component (B), requirements for content of the component (A) will be described below.

1-2. Acidic Polymer

For the aqueous compositions of the present invention, the component (A) is preferably a polymer containing a maleimido group, an ethylenically unsaturated group and an acidic group (hereinafter referred to as acidic polymer) or a salt thereof (hereinafter referred to as acidic polymer (salt)) because such polymers are high in water resistance.

Useful acidic groups include carboxyl, sulfonic acid, and phosphoric acid group, of which carboxyl group is preferred.

A variety of acidic polymers, produced by different methods, are available for the present invention, but those produced by the following methods (1') to (6') are preferred.

(1') Method in which an epoxy-containing unsaturated compound is added to a prepolymer containing a maleimido group and an acidic group.

(2') Method in which an acidic group-containing unsaturated compound is added to a prepolymer containing a maleimido group and an epoxy group, followed by addition of an acid anhydride to the hydroxyl group resulting from the former reaction.

(3') Method in which an isocyante-containing unsaturated compound is added to a prepolymer containing a maleimido group, a hydroxyl group, and an acidic group.

(4') Method in which a hydroxyl-containing unsaturated compound is added to a prepolymer containing a maleimido group, an isocyanate group, and an acidic group.

(5') Method in which a hydroxyl-containing unsaturated compound is added to a prepolymer containing a maleimido group and an acid anhydride group.

(6') Method in which a compound containing a maleimido group and a hydroxyl group and a hydroxyl-containing unsaturated compound is added to a prepolymer containing an acid anhydride group.

1-2-1. Prepolymer Production Method

To produce the maleimide group-containing prepolymer used in methods (1')–(5') as above, a maleimido-containing unsaturated compound can be copolymerized with an acidic group-containing unsaturated compound (as in method (1') described above), an epoxy-containing unsaturated compound (as in method (2') described above), an hydroxyl-containing unsaturated compound and an acidic group-containing unsaturated compound (as in method (3') described above), an isocyanate-containing unsaturated compound and an acidic group-containing unsaturated compound (as in method (4') described above), or an acid-anhydride-containing unsaturated compound (as in method (5') described above). Preferred ones of these unsaturated compounds include the same as described above.

The prepolymer may be copolymerized with other monomers as required. Such other monomers include the same as described above.

Prepolymers can be produced by polymerizing these monomers by an ordinary method such as solution polymerization, emulsion polymerization, or high-temperature continuous polymerization. In the above methods (1') and (2') in which none of isocyanate-containing compounds and acid-anhydride-containing compounds that are both decomposed by water is used, the prepolymer can be produced by any of the above processes, i.e. solution polymerization, emulsion polymerization and high-temperature continuous polymerization. However, in the above methods (3') to (6') in which an isocyanate-containing compound or acid-anhydride-containing compounds is used, it is preferable that the prepolymer is produced by either solution polymerization or high-temperature fast continuous polymerization.

However, if an acidic group-containing unsaturated compound that is high in water-solubility is used for emulsion polymerization, the polymerization process may become unstable, or the acidic group containing-unsaturated compound may polymerize mainly in the water phase instead of being taken into polymer grains. If emulsion polymerization is to be performed, therefore, the acidic group-containing unsaturated compound should have a lipophilicity comparable to methacrylic acids.

Preferred procedures for solution polymerization, emulsion polymerization, and high-temperature continuous polymerization include the same as described above.

To further improve polymerization stability, the compositions of the present invention may include additional emulsifiers unless they impair such properties as water resistance and chemical resistance. Preferred emulsifiers include the same as describe above.

1-2-2. Acidic Polymer Production Method

When the above methods (1') to (5') are used, acidic polymers can be produced by adding an epoxy-containing unsaturated compound (as in method (1')), an acidic group-containing unsaturated compound and an acid anhydride (as in method (2')), an isocyanate-containing unsaturated compound (as in method (3')), or a hydroxyl-containing unsaturated compound (as in methods (4') and (5')) to prepolymers that contain a maleimido group together with an appropriate functional group.

When the above method (6') is used, acidic polymers can be produced by adding a compound containing a maleimido group and a hydroxyl group to acid-anhydride-containing prepolymers.

Preferred ones of these unsaturated compounds include the same as described above.

In the methods (1') and (2') in which none of isocyanate-containing compounds or acid-anhydride-containing compounds that are both decomposed by water is used during prepolymer production or addition reaction of unsaturated compounds, acidic polymers can be produced by adding an appropriate unsaturated compound to a prepolymer in an organic solvent, an aqueous medium or a solventless system. In the methods (3') to (6') in which isocyanate-containing compounds or acid-anhydride-containing compounds are used, it is preferred to add an appropriate unsaturated compound to a prepolymer in an organic solvent or a solventless system.

Conditions required for such an addition reaction can be met simply by selecting an appropriate reaction temperature, reaction time and catalyst.

Weight average molecular weight of the acidic polymers is preferably in the range of 1,000 to 500,000, more preferably in the range of 2,000 to 100,000. If it is less than 1,000, cured films may become insufficient in strength and water resistance. If it is more than 500,000, compositions become too high in viscosity, thereby deteriorating workability or coating performance.

Acid value of the acidic polymer is preferably in the range of 20 to 400, more preferably in the range of 40 to 200. An acid value of less than 20 may cause the dispersion to be unstable, while an acid value of more than 400 may deteriorate cured films in water resistance or alkali resistance. When highly hydrophobic monomers such as 2-ethyhexyl (meth)acrylate, cyclohexyl (meth)acrylate and styrene are used to produce copolymers, their acid value is preferably in the range of 100 to 400.

In the present invention, it is preferred that acidic polymers are in a form of salts that are obtained by partially or entirely neutralizing acidic groups of acidic polymers and dissolving or dispersing them in an aqueous medium for use as an aqueous composition. The resulting aqueous composition will be highly stable.

Conversion of such an acidic polymer into a salt may be performed while it is in the form of a prepolymer or after it has been converted into an acidic polymer. It is preferred, however, to convert a prepolymer by use of ammonia or an organic amine as describe below and then yield a salt of an acidic polymer, particularly because it can work as a catalyst for the addition reaction of an epoxy-containing unsaturated compound.

A prepolymer prepared by solution polymerization or an acidic polymer prepared by addition reaction of an unsaturated compound in an organic solvent can be converted into a salt thereof according to an ordinary method. Such an ordinary method include a method in which a prepolymer or an acidic polymer is added in an aqueous medium under stirring, and a method in which a prepolymer or an acidic polymer is neutralized with an alkali compound to produce a salt of the prepolymer or acidic polymer, followed by addition of the salt to an aqueous medium under stirring.

A prepolymer prepared by emulsion polymerization or an acidic polymer prepared by adding an unsaturated compound to a prepolymer in an aqueous dispersion can be converted into a salt of the prepolymer or the acidic polymer by adding an alkali compound directly to the reaction liquid after completion of the emulsion polymerization reaction or the addition reaction.

The alkali compound includes ammonia, organic amines, and inorganic bases such as sodium hydroxide and potassium hydroxide, of which ammonia and low-molecular-weight organic amines are preferred as they evaporate while cured films are dried, and thus provide the resulting cured films with excellent water resistance.

Low-molecular-weight organic amines include trialkylamines such as trimethylamine, triethylamine, and tributylamine, and hydroxyalkylamines such as N,N-dimethylethanolamine, N-methyldiethanolamine and triethanolamine.

When the present composition comprises a compound containing a (meth)acryloyl group as described later, tertiary amines are preferably used as the above amines because they do not cause addition reaction with the (meth)acryloyl group. Further, amines that contains an ethylenically unsaturated group, such as N,N-dimethylaminoethyl (meth) acrylate, and N,N-dimethylaminopropyl (meth)acrylamide, are preferred as they react during the crosslinking reaction to be incorporated in the crosslinked structure and will not cause deterioration in such properties as water resistance even if they remain as a salt in the coating film.

Degree of neutralization of an acidic polymer is preferably in the range of 10 to 100 mol %, more preferably 30 to 100 mol %, relative to the total amount of acidic groups in the polymer. A neutralization degree of less than 10 mol % may make it difficult for the copolymer to dissolve or disperse in the aqueous medium. Addition amount of the alkali compound is preferably in the range of 10 to 100 mol %, more preferably 30 to 100 mol %, relative to the total amount of acidic groups in the polymer. If this is less than 10 mol %, it may also become difficult for the polymer to dissolve or disperse in the aqueous medium. If this is more than 100 mol %, an odor may remain in the resulting aqueous composition, particularly when the alkali compound is ammonia or an amine.

2. Component (B)

The present invention can contain a component (B), namely, a compound having an ethylenically unsaturated group in addition to the component (A) for the purpose of adjusting strength, flexibility, water resistance, chemical resistance and productivity of coating films. A variety of compounds having an ethylenically unsaturated group, whether monomers or oligomers, can be used as the component (B) unless they are the same as the component (A).

The component (B) is preferably a compound that has, in one molecule, two or more ethylenically unsaturated groups such as (meth)acryloyl groups, as they provide cured products excellent in hardness and abrasion resistance and, in case of aqueous compositions, they improve resultant dry films in strength, water resistance and chemical resistance. Furthermore, the component (B) is preferably an aliphatic or alicyclic compound, rather than an aromatic one, to ensure high durability and high curability.

2-1. Monomers

Useful monomers include (meth)acrylates, vinyl ethers and the like.

Examples of such (meth)acrylates include hydroxyalkyl (meth)acrylates such as 2-hydroxyethyl (meth)acrylates and 2-hydroxypropyl (meth)acrylates; acrylates of alkylene-oxide-added phenols such as phenoxyethyl (meth)acrylates, and halogen-nuclear-substituted products thereof; mono- or di-(meth)acrylates of glycol such as mono- or di-(meth)acrylates of ethylene glycol, mono-or di-(meth)acrylates of methoxyethylene glycol, mono- or di-(meth)acrylates of tetraethylene glycol, and mono- or di-(meth)acrylates of tripropylene glycol; and (meth)acrylates of polyol such as trimethylolpropane tri(meth)acrylates, trihydroxyethylisocyanurate tri(meth)acrylates, pentaerythritol tri(meth)acrylates, pentaerythritol tetra(meth)acrylates, and dipentaerythritol hexaacrylate, as well as (meth)acrylates of said polyol to which alkylene oxide has been added.

Examples of such vinyl ethers include triethylene glycol divinyl ether, cyclohexane dimethyl alcohol divinyl ether, and hydroxyethyl vinyl ether.

Examples of other useful monomers include N-vinylpyrrolidone, N-vinylcaprolactam, acryloyl morpholine, N-vinylformamide, and N-vinylacetamide.

Examples of useful monomers containing two or more ethylenically unsaturated groups include alkylene glycol di(meth)acrylates such as ethylene glycol di(meth)acrylates and propylene glycol di(meth)acrylates; low-molecular-weight polyalkylene glycol di(meth)acrylates such as diethylene glycol di(meth)acrylates, tetraethylene glycol di(meth)acrylates, dipropylene glycol di(meth)acrylates, and tripropylene glycol di(meth)acrylates, as well as alkylene-oxide-modified products thereof; polyol poly(meth)acrylates such as trimethylolpropane tri(meth)acrylates, pentaerythritol di- or tri-(meth)acrylates, pentaerythritol tetra(meth)acrylates, ditrimethylolpropane tetra(meth)acrylates, and dipentaerythritol penta- or hexa-(meth)acrylates, as well as alkylene-oxide-modified products thereof; and di- or tri(meth)acrylates modified with isocyanuric acid alkylene oxide.

2-2. Oligomers

Examples of useful oligomers include urethane (meth)acrylates, polyester (meth)acrylates, epoxy (meth)acrylates, and polyether (meth)acrylates.

Examples of such urethane (meth)acrylate oligomers include reaction products produced by reacting a hydroxyl-containing (meth)acrylate with a reaction product of a polyol and an organic polyisocyanate. Examples of such polyols include low-molecular-weight polyols, polyether polyols, and polyester polyols. Examples of such low-molecular-weight polyols include ethylene glycol, propylene glycol, cyclohexane dimethyl alcohol, and 3-methyl-1,5-pentanediol. Examples of polyether polyols include polyethylene glycol and polypropylene glycol. Examples of such polyester polyols include reaction products of these low-molecular-weight polyols and/or polyether polyols with an acid component including dibasic acids such as adipic acid, succinic acid, phthalic acid, hexahydrophthalic acid, terephthalic acid, and anhydrides thereof. Examples of such organic polyisocyanates include tolylene diisocyanate, 4,4'-diphenylmethane diisocyanate, 4,4'-dicyclohexylmethane diisocyanate, hexamethylene diisocyanate, and isophorone diisocyanate. Examples of such hydroxyl-containing (meth)acrylates include hydroxyalkyl (meth)acrylates such as 2-hydroxyethyl (meth)acrylates, and 2-hydroxypropyl (meth)acrylates.

Examples of useful polyester (meth)acrylates oligomers include dehydration-condensation products of a polyester polyol and a (meth)acrylic acid. Examples of such polyester polyols include reaction products of low molecular weight polyols such as ethylene glycol, polyethylene glycol, cyclohexane dimethyl alcohol, 3-methyl-1, 5-pentanediol, propylene glycol, polypropylene glycol, 1,6-hexanediol and trimethylolpropane or alkylene-oxide-added products thereof, reacted with dibasic acids such as adipic acid, succinic acid, phthalic acid, hexahydrophthalic acid, and terephthalic acid, or anhydrates thereof.

Epoxy acrylates are addition products of epoxy resins reacted with such unsaturated carboxylic acids as (meth)acrylic acid, including epoxy (meth)acrylates of bisphenol A epoxy resin, epoxy (meth)acrylates of phenol or cresol novolak epoxy resin, and (meth)acrylates of polyethers such as diglycidyl ethers.

Examples of such polyether (meth)acrylates include polyalkylene glycol di(meth)acrylates such as polyethylene glycol di(meth)acrylates, and polypropylene glycol di(meth)acrylates, and alkylene-oxide-modified products thereof.

Proportion of the component (A) and the component (B), relative to the total amount of the components (A) and (B), in a composition is preferably 5 to 95 wt % for the component (A) and 95 to 5 wt % for the component (B), more preferably 10 to 90 wt % for the component (A) and 90 to 10 wt % for the component (B). If the component (A) accounts for more than 95 wt % or if the component (B) accounts for less than 5 wt %, cured product may be poor in hardness or abrasion resistance. If the component (A) accounts for less than 5 wt % or if the component (B) accounts for more than 95 wt %, curability may be degraded.

An aqueous composition of the present invention preferably contains the component (B) whose molecule contains two or more ethylenically unsaturated groups in the range of 0 to 120 wt % relative to the component (A) in the composition. Stability of the composition may deteriorate if the proportion exceeds 120 wt %.

To the compositions of the present invention, a compound having one ethylenically unsaturated group may be added as required to adjust adhesion and flexibility of cured films. Examples of useful compounds having one ethylenically unsaturated group include hydroxyalkyl (meth)acrylates such as 2-hydroxyethyl (meth)acrylates and 2-hydroxypropyl (meth)acrylates; (meth)acrylates of an alkylene oxide adduct of a phenol such as phenoxyethyl (meth)acrylates, or halogen-substituted products thereof; mono(meth)acrylates of glycol such as ethylene glycol mono(meth)acrylates, methoxyethylene glycol mono(meth)acrylates, tetraethylene glycol mono(meth)acrylates, and tripropylene glycol mono(meth)acrylates; and N-vinyl compounds such as N-vinylpyrrolidone, and N-vinylcaprolactam.

In case of an aqueous composition of the present, the compound containing two or more (meth)acryloyl groups and/or the compound containing one ethylenically unsaturated group can be stably dispersed by adding these compounds to a polymer-containing aqueous dispersion while stirring. When the compound containing two or more (meth)acryloyl groups and/or the compound containing an ethylenically unsaturated group are used, they function as film formation assistants particularly when they are liquid. Specifically, they are low-molecular-weight compounds until they are polymerized by irradiation with active energy beams, and thus they enter polymer grains and swell them to promote their fusion. After irradiated with active energy beams, they are polymerized to become constituents of the film, and thus are free from problems that could be caused by residual ordinary film formation assistants in the film. So, they are advantageous particularly when a low film formation temperature is required.

3. Photopolymerization Initiator

The compositions of the present invention can be crosslinked, preferably by irradiation with active energy beams. As stated above, copolymers used in the present compositions contain a maleimido group and so they are easily crosslinked when irradiated with active energy beams. Even when irradiated with ultraviolet ray, they require addition of no or only a small amount of photopolymerization initiators to form excellent crosslinks.

The compositions of the invention cure when irradiated with active energy beams, and can be cured effectively by irradiation with ultraviolet ray without use of a photopolymerization initiator, but such an initiator may be added to enhance curability unless it impairs durability.

Examples of such photopolymerization initiators include benzoins and its alkylethers such as benzoin, benzoin methyl ether, benzoin ethyl ether, and benzoin isopropyl ether; acetophenones such as acetophenone, 2,2-dimethoxy-2-phenylacetophenone, 2,2-diethoxy-2-phenylacetophenone, 1,1-dichloroacetophenone, 1-hydroxyacetophenone, 1-hydroxycyclohexylphenyl ketone, and 2-methyl-1-[4-(methylthio)phenyl]-2-Morpholino-propane-1-on; anthraquinones such as 2-methylanthraquinone, 2-ethylanthraquinone, 2-tertiary-butylanthraquinone, 1-chloroanthraquinone, and 2-amylanthraquinone; thioxanthones such as 2,4-dimethylthioxanthone, 2,4-diethylthioxanthone, 2-chlorothioxanthone, and 2,4-diisopropylthioxanthone; ketals such as acetophenondimethylketal, and benzildimethylketal; benzophenones such as benzophenone; and xanthones.

These photopolymerization initiators may be used singly or in combination with a photopolymerization accelerator based on benzoic acid type, amine type, etc.

Such photopolymerization initiators can be added in an amount of preferably 5 parts or less, more preferably 2 parts or less, relative to 100 parts of the composition.

For aqueous compositions of the present invention, water as a dispersion medium and ammonia or organic amines as alkali compounds are preferably evaporated by heating the coated surface before irradiation with active energy beams. This prevents deterioration of film strength and transparency, which would occur if water remain in the film, and also prevents odors and durability deterioration, which would occur if ammonia or organic amines remain in the film.

4. Other Additives

To further improve durability, one or more durability improvers such as ultraviolet ray absorbers, photostabilizers, and antioxidants may be added to the compositions of the invention.

Ultraviolet ray absorbers include those based on benzotriazole such as 2-(5-methyl-2-hydroxyphenyl) benzotriazole and 2-(3,5-di-t-amyl-2-hydroxyphenyl) benzotriazole.

Photostabilizers include those based on hindered amine or benzoate. Hindered amine based photostabilizers include bis(1,2,2,6,6-pentamethyl-4-piperidinyl)sebacate, and 2-(3, 5-di-t-butyl-4-hydroxybenzyl)-2-n-butylmalonic acid bis (1,2,2,6,6-pentamethyl-4-piperidyl). Benzoate-based ones include 2,4-di-t-butylphenyl-3,5-di-t-butyl-4-hydroxybenzoate.

Antioxidants include hindered phenol based ones such as triethylene glycol-bis[3-(3-t-butyl-5-methyl-4-hydroxylphenyl) propionate], and 1,6-hexanediol-bis[3,5-di-t-butyl-4-hydroxyphenyl propionate]

Durability improvers can be added in an amount of preferably 0.01 to 5 parts by weight relative to 100 parts by weight of the composition. If their content is less than 0.01 part by weight, they may fail to work effectively, whereas if it is more than 5 parts by weight, the composition may be deteriorated in curability or degrade cured products in abrasion resistance.

The compositions of the invention may contain fillers such as barium sulfate, silicon oxide, talc, clay, and calcium carbonate; coloring pigments such as phthalocyanine blue, phthalocyanine green, titanium oxide, and carbon black; film formation assistants such as butylcarbitol, butylcarbitolacetate, 2,2,4-trimethylpentanediol-1,3-monoisobutylate (commercially available under the trade name, Txanol, CS-12); and other additives such as adhesion improver, leveling agent, and antifoaming agent; as well as polymerization inhibitors such as hydroquinon, hydroquinon monomethyl ether, phenothiazine, and N-nitrosophenyl hydroxylamine aluminum salt. Such additives can be added in an amount of preferably 100 parts by weight or less relative to 100 parts by weight of the compolymer, though polymerization inhibitors should be added in an amount of 10 ppm by weight to 2 parts by weight relative to the composition.

5. Usage

The compositions of the present invention can be crosslinked by irradiation with active energy beams such as solar light, electron beam and ultraviolet ray. They may be used as they are, or may be used in combination with various additives.

The compositions of the present invention can be cured by irradiation with active energy beams, and ultraviolet ray, X-ray and electron beam are preferably used, and ultraviolet ray is more preferably used because it only requires inexpensive equipment. A variety of ultraviolet ray sources, including high-pressure mercury-vapor lamp, metal halide lamp, xenon lamp, electrodeless discharge lamp, and carbon arc lamp, are available to perform curing. If compositions of the invention are used as paints for outdoor use, they may also be cured and crosslinked by solar light and produce cured films with good properties.

The compositions of the invention can be used in ordinary methods. For example, when the compositions are used as coatings, adhesives, binders, etc., they are applied to articles or substrates by ordinary methods, followed by irradiation with active energy beams such as solar light, ultraviolet ray and electron beam for curing, and when the compositions are used as molding materials or the like, they are injected into appropriate molds and irradiated with active energy beams for curing. Methods for irradiation with active energy beams may be those conventionally known as methods for hardening active energy beam-curable compositions.

The compositions of the invention provide coating films and molded articles with high durability and abrasion resistance, and thus can serve to produce coatings, adhesives, binders, and molded products.

As the imido portion of the component (A) is high in polarity, the present compositions can achieve strong adhesion to various plastic materials. Furthermore, the compositions are excellent in abrasion resistance and durability, and thus they can advantageously be used as materials for hard coat of plastics as well as molding materials.

As the present compositions are also excellent in ultraviolet ray curability, they can serve to provide binders for various resist materials and coloring materials and to provide photosensitive resins to be roughened or patterned by surface processing techniques such as photomechanical process.

The aqueous compositions of the present invention may be used as, for example, coating materials including paints, coatings and inks, bonding agents for non-woven fabrics, adhesives, fillers, and resists. Among them, the aqueous compositions are quite useful for coating materials, particularly for paints.

The compositions of the invention designed for use as a coating material (hereinafter referred to as coating compositions) may contain synthetic resins such as acrylic resin, ketone resin, and petroleum resin; fillers such as organic and inorganic extender pigments, delustering agents, and sanding assistants; and other various additives such as leveling agents, antifoaming agents, thickeners, dispersing agents for pigments, brightening agents, slipping agents, and thixotropic agents; as required.

Articles or substrates that the above coating compositions can be applied to include wood materials including natural wood and synthetic wood; molded resin products (plastics) such as of polycarbonate, polymethyl methacrylates, and polyvinyl chloride; and other materials such as metal, glass, concrete, stone, and paper. The aqueous compositions of the invention are good in adhesion to wood materials, and thus are advantageously used as paints for wood.

A typical procedure for using the coating compositions of the invention is as follows: compositions are coated on substrates and dried to evaporate water, followed by irradiation with active energy beams. Conventionally known coating methods including those using a roll coater or flow coater, spraying, dipping, and brush coating may be used. Irradiation with active energy beams may also be performed by ordinary methods.

EXAMPLES

Examples are given below to illustrate the present invention more specifically. In the following description, "%" and "parts" mean "wt %" and "parts by weight", respectively. Abbreviations used are listed below.

MMA: methyl methacrylate
BA: butyl acrylate
MAA: methacrylic acid
GMA: glycidyl methacrylate
HEA: hydroxyethyl acrylate
MOI: methacryloxyethyl isocyanate
AA: acrylic acid
St: styrene
ML: maleic anhydride
HBVE: hydroxybutylvinyl ether
EA: ethylacrylate
CHA: cyclohexylacrylate
OTG: octyl thioglycollate
TEA: triethylamine THPI-A: 3,4,5,6-tetrahydrophthalimidoethylacrylate

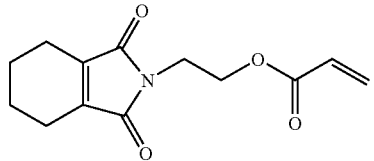

(13)

DMI-M: dimethylmaleimidoethyl methacrylate

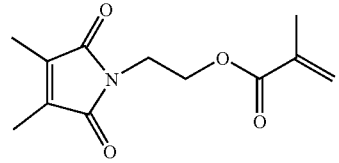

(14)

CI-ETA: hydroxyethyl citracoimide

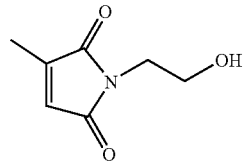

(15)

THPI-GL: carboxymethyl tetrahydrophthalimide

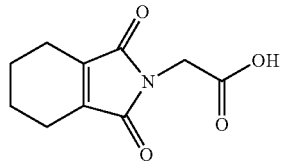

(16)

Production Example 1-1

At room temperature, 30 g of THPI-A, 14 g of MMA, 20 g of BA, 26 g of MAA, and 100 g of butyl acetate were put in a flask equipped with a stirrer, a thermometer, and a cooling tube, and stirred to dissolve them, followed by addition of 3 g of 2,2'-azobis (2-methylbutylonitrile) which was dissolved to provide a uniform solution. The solution was then stirred at 85° C. for 2 hours under a nitrogen gas stream, followed by additional stirring at 100° C. for 1 hour to produce a prepolymer.

To the resulting prepolymer solution, 10 g of GMA, 0.5 g of triethylamine, and 0.1 g of hydroquinone were added and stirred to ensure dissolution. The resulting solution was then heated and stirred at 100° C. for 5 hours to provide a copolymer A1-1.

Production Example 1-2

At room temperature, 40 g of DMI-M, 20 g of MMA, 14 g of BA, 11 g of HEA, and 100 g of butyl acetate were put in the same flask as described in Production example 1-1, and stirred to dissolve them, followed by addition of 3 g of 2,2'-azobis(2-methylbutylonitrile) which was dissolved to provide a uniform solution. The solution was then heated and stirred under the same conditions as in Production example 1-1 to produce a prepolymer.

To the resulting prepolymer solution, 15 g of MOI, 0.1 g of dibutyltin laurate, and 0.1 g of hydroquinone were added and stirred to ensure dissolution. The resulting solution was then heated and stirred at 60° C. for 3 hours to provide a copolymer A1-2.

Production Example 1-3

A prepolymer was produced by carrying out polymerization in the same manner as in Production example 1-1, except that 20 g of THPI-A, 10 g of MMA, 11 g of BA, and 39 g of GMA were used as raw materials.

A copolymer A1-3 was then produced by carrying out reaction in the same manner as in Production example 1-1, except that 20 g of AA was used as a raw material.

Production Example 1-4

A prepolymer was produced by carrying out polymerization in the same manner as in Production example 1-1, except that 50 g of DMI-M, 20 g of MMA, 7 g of BA, and 13 g of MOI were used as raw materials.

A copolymer A1-4 was then produced by carrying out reaction in the same manner as in Production example 1-2, except that 10 g of HEA was used as a raw material.

Production Example 1-5

A prepolymer was produced by carrying out polymerization in the same manner as in Production example 1-1, except that 60 g of THPI-A, 5 g of MMA, and 20 g of MOI were used as raw materials.

A copolymer A1-5 was then produced by carrying out reaction in the same manner as in Production example 1-2, except that 15 g of HBVE was used as a raw material.

Production Example 1-6

A prepolymer was produced by carrying out polymerization in the same procedure as in Production example 1-1, except that 30 g of DMI-M, 18 g of St, 17 g of ML, and 15 g of BA were used as raw materials.

A copolymer A1-6 was then produced by carrying out reaction in the same procedure as in Production example 1-1, except that 20 g of HEA was used as a raw material.

Production Example 1-7

A prepolymer was produced by carrying out polymerization in the same procedure as in Production example 1-1, except that 20 g of St, 25 g of ML, and 20 g of BA were used as raw materials.

A copolymer A1-7 was then produced by carrying out reaction in the same manner as in Production example 1-1, except that 20 g of CI-ETA and 15 g of HEA were used as raw materials.

Production Example 1-8

A prepolymer was produced by carrying out polymerization in the same manner as in Production example 1-1, except that 20 g of MMA and 40 g of GMA were used as raw materials.

A copolymer A1-8 was then produced by carrying out reaction in the same manner as in Production example 1-1, except that 30 g of THPI-GL and 10 g of AA were used as raw materials.

The compositions and the production methods of the above copolymers A1-1 to A1-8 are summarized in Table 1-1 together with number average molecular weight (Mn), weight average molecular weight (Mw) and the percentage of nonvolatile matter in the composition (NV).

TABLE 1-1

| Copolymer | Production method | Amount of monomers in copolymer (g) Prepolymer | | | | | | | Mn $*10^{-3}$ | Mw $*10^{-3}$ | NV (%) |
|---|---|---|---|---|---|---|---|---|---|---|---|
| A1-1 | (2) | THPI-A 30 | MMA 14 | BA 20 | MAA 26 | GMA 10 | | | 8.9 | 20.1 | 49.7 |
| A1-2 | (1) | DMI-M 40 | MMA 20 | BA 14 | HEA 11 | MOI 15 | | | 11.2 | 24.9 | 49.3 |
| A1-3 | (3) | THPI-A 20 | MMA 10 | BA 11 | GMA 39 | AA 20 | | | 10.3 | 23.8 | 48.7 |
| A1-4 | (4) | DMI-M 50 | MMA 20 | BA 7 | MOI 13 | HEA 10 | | | 11.9 | 24.1 | 50.3 |
| A1-5 | (4) | THPI-A 60 | MMA 5 | MOI 20 | | HBVE 15 | | | 12.6 | 25.4 | 49.2 |
| A1-6 | (5) | DMI-M 30 | St 18 | ML 17 | BA 15 | HEA 20 | | | 7.9 | 18.9 | 49.3 |
| A1-7 | (6) | St 20 | ML 25 | BA 20 | | CI-ETA 20 | HEA 15 | | 9.8 | 23.1 | 50.2 |
| A1-8 | (7) | MMA 20 | GMA 40 | | | THPI-GL 30 | AA 10 | | 14.3 | 33.5 | 49.9 |

Comparative Production Examples 1-1 and 1-2

Using the materials given in Table 1-2, polymerization was carried out in the same manner as in the prepolymer production of Production example 1-1 to provide copolymers C1-1 and C1-2.

TABLE 1-2

| Copolymer | Amount of monomers in copolymer (g) | | | Mn $*10^{-3}$ | Mw $*10^{-3}$ | NV (%) |
|---|---|---|---|---|---|---|
| C1-1 | THPI-A 30 | MMA 40 | BA 30 | 9.9 | 25.9 | 48.3 |
| C1-2 | MMA 60 | BA 40 | | 12.9 | 30.9 | 49.1 |

Example 1-1

According to an ordinary method, 140 parts (solid 70 parts) of the solution of the copolymer A1-1 produced in Production example 1-1 and 30 parts of ethylene oxide 3-mol modified triacrylate of trimethylolpropane (Aronix M-350 (trade name) manufactured by Toagosei Co., Ltd.) were mixed together to provide an active energy beam-curable composition.

The resulting composition was evaluated on curability, durability, abrasion resistance, and adhesion according to the following procedures. Results are shown in Table 1-3.

Curability

A bonderized steel sheet (PB-144 (trade name) manufactured by Nippon Testpanel Co., Ltd), which was used as a substrate, was coated with the resulting composition up to a thickness of 10 µm, dried at 50° C. for 30 min, and moved on an conveyor to pass several times under a single 120 W/cm condensing-type high-pressure mercury lamp at a speed of 10 m/min. Curability was evaluated in terms of the number of passes required for the surface to become free of tack when touched with fingers.

Durability

A white polyvinyl chloride sheet supplied by Nippon Testpanel Co., Ltd., which was used as a substrate, was coated with the resulting composition up to a thickness of 10 µm, dried at 50° C. for 30 min, and moved on an conveyor to pass several times under a single 120 W/cm condensing-type high-pressure mercury lamp (10 cm height) at a speed of 10 m/min. To prepare a specimen, curing was performed until the surface became free of tack when touched with fingers.

Dewpanel Light Control Weather Meter DPWL-5R (trade name), supplied by Suga Test Instrument Co., Ltd., was used as an accelerated exposure tester to expose the specimen to a wet environment (100% RH, 40° C.) for 6 hours and to light irradiation (30W/m$^2$, 40° C.) for 6 hours, alternately and repeatedly for a total of 500 hours. Durability was evaluated based on changes in appearance determined by visual observation and discoloration determined by a color-difference meter (Sigma 80 (trade name) manufactured by Nippon Denshoku Industries Co., Ltd.). The symbols ○, ∆ and X in Table 1-2, which shows results of appearance evaluation, mean as follows:

○: free of cracks
∆: a few cracks found
X: cracks found over entire film

Abrasion Resistance

A polycarbonate sheet supplied by Nippon Testpanel Co., Ltd., which was used as a substrate, was coated with the resulting composition up to a thickness of 10 µm, dried at 50° C. for 30 min, and moved on an conveyor to pass several times under a single 120 W/cm condensing-type high-pressure mercury lamp (10 cm height) at a speed of 10 m/min. To prepare a specimen, curing was performed until the surface became free of tack when touched with fingers.

A piece of #000 steel wool was attached to the tip of a cylinder with a diameter of 25 mm, and then allowed to come in contact with the cured film of the specimen that was held horizontally, and rotated 5 times (20 rpm) under a load of 1.0 kg. Degree of resulting flaws was determined by visual observation. The symbols ◎, ○, ∆ and X in Table 2 mean as follows:

◎: no flaw found on specimen surface
○: a few flaws found on specimen surface
∆: many flaws found on specimen surface
X: Substrate surface exposed out of flawed portions Adhesion A specimen was prepared in the same manner as for the abrasion resistance test and subjected to a cellophane-tape peeling test according to JIS (Japanese Industrial Standard) K-5400, using a polycarbonate sheet of Nippon Testpanel Co., Ltd. as a substrate. The number of remaining squares out of 100 squares was counted, and evaluation was made according to the following three-rank criterion:

○: more than 90
∆: 10 to 90
X: less than 10

Examples 1-2 to 1-8

Compositions were prepared in the same manner as in Example 1-1 according to the formulations given in Table 1-3 below. The resulting compositions were evaluated in the same manner as in Example 1-1. Results are shown in Table 1-3.

TABLE 1-3

| Example | Component (A) | Component (B) | Curability (number of passes) | Durability Appearance | Color difference ∆E | Abrasion resistance | Adhesion | Odor |
|---|---|---|---|---|---|---|---|---|
| 1-1 | A1-1 70 | M350[1) ] 30 | 2 | ○ | 1.0 | ◎ | ○ | ○ |
| 1-2 | A1-2 100 | | 3 | ○ | 0.9 | ○ | ○ | ○ |
| 1-3 | A1-3 80 | M400[2) ] 20 | 1 | ○ | 0.8 | ◎ | ○ | ○ |
| 1-4 | A1-4 50 | M350 50 | 2 | ○ | 1.2 | ○ | ○ | ○ |
| 1-5 | A1-5 90 | DVE-3[3) ] 10 | 2 | ○ | 1.0 | ○ | ○ | ○ |
| 1-6 | A1-6 30 | M350 70 | 3 | ○ | 1.6 | ◎ | ○ | ○ |

TABLE 1-3-continued

| Example | Component (A) | Component (B) | Curability (number of passes) | Durability Appearance | Color difference ΔE | Abrasion resistance | Adhesion | Odor |
|---|---|---|---|---|---|---|---|---|
| 1-7 | A1-7 50 | M350 50 | 3 | ○ | 1.5 | ○ | ○ | ○ |
| 1-8 | A1-8 50 | M350 50 | 2 | ○ | 0.5 | ○ | ○ | ○ |

In Table 1-3, figures in the columns for the components (A) and (B) show their amounts in parts. The amount of the component (A) is its solid content, and the abbreviations in Table 1-3 mean as follows:
[1] M-350: ethylene oxide 3-mol modified triacrylate of trimethylolpropane (Aronix M-350 (trade name) manufactured by Toagosei Co., Ltd., hereinafter referred to as M-350)
[2] M-400: mixture of dipentaerythritol pentaacrylate (about 20 wt %) and hexaacrylate (about 80 wt %) (Aronix M-400 (trade name) manufactured by Toagosei Co., Ltd., hereinafter referred to as M-400)
[3] DVE-3: triethylene glycol divinyl ether (Rapicure DVE-3 (trade name) manufactured by ISP Corp.)
[4] Irg184: hydroxycyclohexyl acetophenone (photopolymerization initiator, Irgacure 184 (trade name) manufactured by Ciba-Geigy Co., Ltd.)

In Table 1-3, figures in the columns for the components (A) and (B) show their amounts in parts. The amount of the component (A) is its solid content, and the abbreviations in Table 1-3 mean as follows:
1) M-350: ethylene oxide 3-mol modified triacrylate of trimethylolpropane (Aronix M-350 (trade name) manufactured by Toagosei Co., Ltd., hereinafter referred to as M-350)
2) M-400: mixture of dipentaerythritol pentaacrylate (about 20 wt % ) and hexaacrylate (about 80 wt % ) (Aronix M-400 (trade name) manufactured by Toagosei Co., Ltd., hereinafter referred to as M-400)
3) DVE-3: triethylene glycol divinyl ether (Rapicure DVE-3 (trade name) manufactured by ISP Corp.)
4) Irg184: hydroxycyclohexyl acetophenone (photopolymerization initiator, Irgacure 184 (trade name) manufactured by Ciba-Geigy Co., Ltd.)

Comparative Examples 1-1 and 1-2

Compositions were prepared in the same manner as in Example 1-1 according to the formulations given in Table 1-4 below.

The resulting compositions were evaluated in the same manner as in Example 1-1. Results are shown in Table 1-4.

TABLE 1-4

| Comparative Example | Copolymer | Component (B) | Photo-Initiator | Curability | Durability Appearance | Color difference ΔE | Abrasion resistance | Adhesion | Odor |
|---|---|---|---|---|---|---|---|---|---|
| 1-1 | C1-1 50 | M350 50 | | 6 | ○ | 1.3 | Δ | ○ | ○ |
| 1-2 | C1-2 50 | M350 50 | Irg184 2 | 5 | Δ | 5.9 | Δ | Δ | X |

In Table 1-4, figures in the columns for the copolymers and the component (B) show their amounts in parts. The amount of the copolymers is their solid contents, and the abreviations in Table 1-4 mean the same as above.

In Table 1-4, figures in the columns for the copolymers and the component (B) show their amounts in parts. The amount of the copolymers is their solid contents, and the abbreviations in Table 1-4 mean the same as above.

Results shown above indicate that the compositions of the present invention cure rapidly without a photopolymerization initiator when irradiated with active energy beams and that the resulting cured products are not only excellent in durability but also excellent in abrasion resistance and adhesion.

Production Example 2-1

A flask equipped with a stirrer, a thermometer and a cooling device, and containing 145 parts of ion exchanged water was set on an water bath and heated up to an inner temperature of 80° C. while nitrogen is supplied thereto. Then, a solution of 1 part of ammonium persulfate as polymerization initiator in 3 parts of ion exchanged water was added. After 5 minutes following the addition, 100 parts of a mixture of a monomer and a chain transfer agent shown in Table 2-1, was dripped over a period of 2 hours at 80° C., and after the completion of dripping, maintained at 80° C. for additional 1 hour. Subsequently, 0.1 part of t-butylhydroperoxide diluted with 2 parts of ion exchanged water was added. After 5 minutes, 0.3 part of sodium hydrosulfite diluted with 4 parts of ion exchanged water was added, and the inner temperature was maintained at 80° C. for 1 hour.

Then, 30 parts of ion exchanged water, 8.8 parts of TEA and 0.05 part of hydroquinone monomethyl ether were poured in the reaction solution, followed by stirring for 1 hour to ensure neutralization of acidic polymers. TEA also serves as a catalyst for the subsequent addition reaction.

After confirming that no aggregates had formed in the reactor and that the inner temperature had been stably at 80° C., 12.4 parts of GMA was added and the solution was maintained at an inner temperature of 80° C. for 2 hours for addition reaction to provide a liquid containing of an acidic polymer A2-1 dissolved or dispersed in water (hereinafter referred to as aqueous liquid).

Examination of the properties of the aqueous liquid showed that it had a solid content of 38.1% (content of nonvolatile matters measured after heating at 155° C. for 30 min, hereinafter the same), pH of 7.5, and viscosity of 340 mpa·s (measured with BM type viscometer at 60 rpm and 25° C., hereinafter the same).

The aqueous liquid containing the acidic polymer A2-1 was analyzed by gas chromatography (hereinafter abbreviated as GC), and the result showed no peaks attributable to unreacted GMA or water-added products of GMA. The aqueous liquid was treated with diluted hydrochloric acid and the acidic polymer A2-1 was isolated by an ordinary method. Observation was conducted for 1H-NMR of the isolated acidic polymer A2-1, showing that peaks attributable to protons connected to unsaturated double-bonded carbons appeared at 5.6 ppm and 6.2 ppm. Their integrated intensities substantially corresponded to a 100% degree of GMA addition. Thus, GC and 1H-NMR observations proved that the degree of GMA addition was nearly 100%. Mw and Mn of the acidic polymer A2-1 were 15,500 and 5,800, respectively.

ner as in Production example 2-1, except that the formulation for monomer, chain transfer agent, and TEA shown in Table 2-1 was employed and that GMA addition reaction was not performed. The aqueous liquid had a solid content of 35.9%, pH of 6.9 and viscosity of 67 mP·s. Measurements of Mw and Mn are shown in Table 2-1.

Comparative Production Example 2-2 (Production of Acidic Polymer C2-2)

An aqueous liquid containing an acidic polymer C2-2 was produced by carrying out polymerization in the same manner as in Production example 2-1, except that the formulation for monomer, chain transfer agent, TEA and GMA shown in Table 2-1 was employed. The aqueous liquid had a solid content of 37.8%, pH of 7.2 and viscosity of 98 mp·s. Dgree of GMA addition reaction observed in the same manner as in Production example 2-1 was nearly 100%. Measurements of Mw and Mn are shown in Table 2-1.

TABLE 2-1

| | Salt of acidic polymer | Monomer and chain transfer agent (parts) | | | | | | Neutralization (parts) | Addition (parts) | | Mn | Mw |
|---|---|---|---|---|---|---|---|---|---|---|---|---|
| | | THPI-A | EA | MMA | CHA | MAA | OTG | TEA | GMA | A-200 | $*10^{-3}$ | $*10^{-3}$ |
| Production example 2-1 | A2-1 | 30 | 25 | 25 | | 15 | 5 | 8.8 | 12.4 | | 5.8 | 15.5 |
| Production example 2-2 | A2-2 | 30 | | 50 | | 15 | 5 | 10.6 | 8.26 | | 4.9 | 12.4 |
| Production example 2-3 | A2-3 | 30 | | 22 | 23 | 20 | 5 | 10.6 | 8.26 | | 5.5 | 16.1 |
| Production example 2-4 | A2-4 | 30 | 25 | 25 | | 15 | 5 | 10.6 | | 10.6 | 5.4 | 16.2 |
| Comparative production example 2-1 | C2-1 | 30 | 25 | 25 | 15 | 15 | 5 | 10.6 | | | 4.9 | 13.8 |
| Comparative production example 2-2 | C2-2 | | | 54 | 22 | 20 | 4 | 10.6 | 8.26 | | 6.5 | 15.7 |

Production Examples 2-2 to 2-4 (Production of Acidic Polymers A2-2 to A2-4)

Aqueous liquids containing acidic polymers were produced by carrying out the same procedure as in Production example 2-1, except that the formulations for monomer, chain transfer agent, TEA and GMA shown in Table 2-1 were employed. In Production examples 2-4, A-200 (trade name), namely an epoxy methacrylate supplied by Daicel Chemical Industries, Ltd. (a compound represented by the formula (9) where R is methyl group) was used instead of GMA. Properties of acid polymers A2-2 to A2-4 were as follows:

A2-2: solid content 37.5%, pH7.5, viscosity 162mP·s
A2-3: solid content 37.6%, pH7.2, viscosity 38mP·s
A2-4: solid content 37.9%, pH7.0, viscosity 83mP·s Degree of GMA addition reaction measured by the same procedure as in Production example 2-1 was nearly 100% for the acidic polymers A2-2 and A2-3, and about 70% for the acidic polymers A2-4.

Measurements of Mw and Mn are shown in Table 2-1.

Comparative Production Example 2-1 (Production of Acidic Polymer C2-1)

An aqueous liquid containing an acidic polymer C2-1 was produced by carrying out polymerization in the same man- Example 2-1

To the aqueous liquid containing the acidic polymer A2-1 produced in Production example 2-1, M-350 and M-400 were added according to the formulation shown in Table 2-2 to provide an aqueous emulsion containing of M-350 and M-400 emulsified and dispersed stably by the effect of the triethylamine salt of the acidic polymer A2-1.

To the resulting emulsion, an antifoaming agent (BYK-024 (trade name) manufactured by BYK-Chemie) and a leveling agent (BYK-346 (trade name) manufactured by BYK-Chemie) were respectively added at proportions of 0.2% and 0.5% relative to the total weight of the acidic polymer A2-2 (solid content), M-350 and M-400 to provide an aqueous paint composition for wood.

Using a bar coater, the resulting composition was applied over a commercial unsaturated polyester coated plywood to produce a coating film thereon so that the film had a thickness of 20 to 25 μm after dried. Immediately after the coating, the coated plywood was dried at 60° C. for 5 minutes, followed by ultraviolet ray irradiation under the following conditions:

Lamp type: 80 W/cm condensing-type high-pressure mercury lamp,

Lamp height: 10 cm,

Conveyor speed: 10 m/min, and

Number of passes under the lamp: twice.

The resulting cured film was evaluated for the following items (1) to (10). Results of the evaluation are shown in Table 2-2.

(1) Gloss

A glossmeter (manufactured by Nippon Denshoku Industries Co., Ltd.) was used to measure 60° gloss.

(2) Adhesion

Grid-like cuts were made in the resulting cured film at intervals of 2 mm using a cutter knife to produce 100 squares. Commercial cellophane tape (manufactured by Nichiban Co., Ltd.) was pressed and adhered to the film surface and then peeled off, and the number of the remaining squares was counted.

(3) Pencil Hardness

Hardness of the resulting cured film was evaluated according to the "Handwriting Method" of JIS (Japanese Industrial Standard) K5400.

(4) Acetone Rubbing Test

A swab containing acetone was used to rub the surface of the resulting cured film back and forth with a load of 500 g and at a speed of 1 second for one back-and-forth trip. Quality was evaluated according to the following three-rank criterion based on the number of back-and-forth trips required for the cured film surface to suffer from injuries such as whitening and peeling:

○: No injuries found on cured film after 50 trips

Δ: Injuries found on cured film after 20–49 trips

X: Injuries found on cured film after less than 20 trips (5) Water Resistance

Distilled water was put as test liquid on the cured film and wiped off after 6 hours, and the cured film was observed visually. Evaluation was performed according the following three-rank criterion:

○: No injuries found on cured film

Δ: Slight injuries found on cured film

X: Distinct injuries, such as whitening, cracking, and lifting, found on cured film (6) Acid Resistance Evaluation was carried out by the same procedure as in (5) above, except that 5% aqueous acetic acid solution was used as test liquid.

(7) Alkali Resistance

Evaluation was carried out by the same procedure as in (5) above, except that 1% aqueous sodium carbonate solution was used as test liquid.

(8) Alcohol Resistance

Evaluation was carried out by the same procedure as in (5) above, except that 50% aqueous ethanol solution was used as test liquid.

(9) Solvent Resistance

Evaluation was carried out by the same procedure as in (5) above, except that a 1:1 solution of ethyl acetate and xylene was used as test liquid.

(10) Odor

After the completion of the curing by ultraviolet ray irradiation, odor of the cured film was examined, and evaluation was carried out according the following three-rank criterion:

○: No odor

Δ: Slight odor

X: Distinct odor

Examples 2-2 to 2-8 and Comparative Examples 2-1 to 2-3

A wood paint composition was produced in the same manner as in Example 2-1, except that the formulations shown in Tables 2-2 and 2-3 were employed. As photopolymerization initiator, Irg-500 (1:1 mixture of 1- hydroxy-cyclohexyl-phenyl ketone and benzophenone, Irgacure-500 (trade name) manufactured by Ciba Specialty Chemicals) was used in Examples 2-2 and 2-8 and Comparative examples 2-2 and 2-3.

The resulting compositions were evaluated in the same manner as in Example 2-1. Results are shown in Table 2-2 and 2-3.

TABLE 2-2

| | Example | 2-1 | 2-2 | 2-3 | 2-4 | 2-5 | 2-6 | 2-7 | 2-8 |
|---|---|---|---|---|---|---|---|---|---|
| Components (parts) | Salt of acidic polymer* | A2-1 65 | A2-1 65 | A2-2 65 | A2-3 65 | A2-4 65 | A2-2 50 | A2-2 50 | A2-2 40 |
| | M-400 | 20 | 20 | 20 | 20 | 20 | 40 | 40 | 48 |
| | M-350 | 15 | 15 | 15 | 15 | 15 | | | |
| | M-240 | | | | | | 10 | | 12 |
| | DVE-3 | | | | | | | 10 | |
| | Irg-500 | | 0.3 | | | | | | 0.3 |
| Evaluation | Gloss | 82 | 84 | 83 | 85 | 80 | 89 | 90 | 88 |
| | Adhesion | 100 | 100 | 100 | 100 | 100 | 100 | 100 | 95 |
| | Pencil hardness | H | H | H | H | H | 2H | 2H | 3H |
| | Acetone rubbing | ○ | ○ | ○ | ○ | ○ | ○ | ○ | ○ |
| | Water resistance | ○ | ○ | ○ | ○ | ○ | ○ | ○ | ○ |
| | Acid resistance | Δ | Δ | Δ | ○ | Δ | ○ | ○ | ○ |
| | Alkali resistance | ○ | ○ | ○ | ○ | ○ | ○ | ○ | ○ |
| | Alcohol resistance | Δ | Δ | Δ | Δ | Δ | ○ | ○ | ○ |

TABLE 2-2-continued

| Example | 2-1 | 2-2 | 2-3 | 2-4 | 2-5 | 2-6 | 2-7 | 2-8 |
|---|---|---|---|---|---|---|---|---|
| Organic solvent resistance | Δ | ○ | ○ | ○ | Δ | ○ | ○ | ○ |
| Odor | ○ | Δ | ○ | ○ | ○ | ○ | ○ | Δ |

*The amount in parts of acidic polymer salts represents the amount of solid contained in the aqueous liquid.

TABLE 2-3

| Comparative Example | | 2-1 | 2-2 | 2-3 |
|---|---|---|---|---|
| Components (parts) | Salt of acidic polymer* | C2-1 | C2-1 | C2-2 |
| | | 65 | 65 | 50 |
| | M-400 | 20 | 20 | 40 |
| | M-350 | 15 | 15 | |
| | M-240** | | | 10 |
| | DVE-3*** | | | |
| | Irg-500 | | 0.3 | 3.0 |
| Evaluation | Gloss | 85 | 85 | 82 |
| | Adhesion | 100 | 100 | 40 |
| | Pencil hardness | H | H | 2H |
| | Acetone rubbing | Δ | ○ | ○ |
| | Water resistance | ○ | ○ | ○ |
| | Acid resistance | Δ | Δ | Δ |
| | Alkali resistance | X | X | ○ |
| | Alcohol resistance | X | X | Δ |
| | Organic solvent resistance | Δ | ○ | ○ |
| | Odor | ○ | Δ | X |

*The amount in parts of acidic polymer salts represents the amount of solid contained in the aqueous liquid.
**M-240: tetraethylene glycol diacrylate (Aronix M-240 (trade name), manufactured by Toagosei Co., Ltd.)
***DVE-3: triethylene glycol divinyl ether (Rapicure DVE-3 (trade name), manufactured by ISP, Corp.)

The above results show that the aqueous compositions of the present invention are excellent in crosslinkability by irradiation with active energy beams, and provide cured films that are free from coloring and odors, excellent in adhesion, hardness and water resistance, and particularly excellent in chemical resistance, and that the compositions are suitable as paints, particularly those for wood.

What is claimed is:

1. A crosslinkable resin composition, comprising (A) a polymer that contains a maleimido group represented by formula (1):

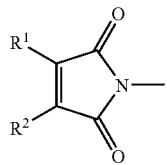

wherein (i) one of $R^1$ one of $R^2$ represents a hydrogen action while the other represents an alkyl group having 4 or less carbon atoms, (ii) both $R^1$ and $R^2$ represent an alkyl group having 4 or less carbon atoms, or (iii) $R^1$ and $R^2$ are a saturated hydrocarbon group in the form of a carbocyclic structure and an ethylenically unsaturated group on a side chain thereto, said polymer having a number average molecular weight of 1,000 or more.

2. A crosslinkable resin composition as defined in claim 1, in which said maleimido group is bonded via an ester or urethane linkage to an ethylenically unsaturated group-containing polymer.

3. A crosslinkable resin composition as defined in claim 1, in which said ethylenically unsaturated group is bonded via on ester or urethane linkage to a maleimido group-containing polymer.

4. A crosslinkable resin composition as defined in claim 1, further comprising (B) a compound, other than the component (A), containing an ethylenically unsaturated group.

5. A crosslinkable resin composition as defined in claim 1, in which said ethylenically unsaturated group of the component (A) is acryloyl or methacryloyl group.

6. A crosslinkable resin composition as defined in claim 4, in which the component (B) is a compound having two or more ethylenically unsaturated groups.

7. A crosslinkable resin composition as defined in claim 6, in which said thylenically unsaturated groups of the component (B) are acryloyl or methacryloyl groups.

8. A crosslinkable resin composition as defined in claim 1, in which said composition is an aqueous crosslinkable resin composition.

9. An aqueous crosslinkable resin composition as defined in claim 8, in which the component (A) is dissolved or dispersed in an aqueous medium.

10. An aqueous crosslinkable resin composition as defined in claim 1, in which the component (A) is a polymer containing a maleimido group represented by said formula (1), an ethylenically unsaturated group and an acidic group, or a salt of the polymer.

11. An aqueous crosslinkable resin composition as defined in claim 10, in which said acidic group is a carboxyl group.

12. An aqueous crosslinkable resin composition as defined in claim 11, further comprising (B) a compound, other than the component (A), containing two or more ethylenically unsaturated groups.

13. An aqueous crosslinkable resin composition as defined in claim 12, which said ethylenically unsaturated groups of the component (B) are acryloyl or methacryloyl groups.

14. A crosslinkable resin composition comprising a compound as defined in claim 1, said resin composition crosslinkable by irradiating with an active energy beam.

15. A method for coating an article, which comprises applying a composition of claim 1 to an article, and then irradiating the composition with an active energy beam.

16. An aqueous crosslinkable resin composition comprising a composition as defined in claim 1, said resin composition crosslinkable by irradiation with an active energy beam.

17. A method of coating an article, which comprises applying a composition of claim 1 to an article, and then irradiating the composition with an active energy beam.

18. An aqueous paint for wood, comprising a composition as defined in claim 1, said paint crosslinkable by irradiation with an ultraviolet light.

19. A method for coating wood, which comprises applying a composition of claim 1 to wood, and then irradiating the composition with an ultraviolet light.

20. A crosslinkable resin composition defined in claim 1 in which said polymer has a number average molecular weight of 1,000 to 1,000,000.

21. A cross-linkable resin composition according to claim 1 in which $R^1$ and $R^2$ form a saturated hydrocarbon group by combining together to form a carbocyclic structure.

22. A cross-linkable resin composition as defined in claim 1, wherein $R^1$ and $R^2$ form a saturated hydrocardbon group by combining together to form a carbocyclic structure.

23. A cross-linkable resin composition as defined in claim 1, wherein $R^1$ and $R^2$ form group represented by —$CH_2CH_2CH_2CH_2$—.

24. A cross-linkable resin composition as defined in claim 10, wherein $R^1$ and $R^2$ form a group represented by —$CH_2CH_2CH_2CH_2$—.

* * * * *